United States Patent

West

[15] 3,683,218
[45] Aug. 8, 1972

[54] ROTARY ELECTRICAL DEVICE
[72] Inventor: Charles E. West, Bryn Mawr, Pa.
[73] Assignee: Harowe Servo Controls, Inc.
[22] Filed: Aug. 16, 1971
[21] Appl. No.: 172,097

[52] U.S. Cl.................................310/80, 340/198
[51] Int. Cl..............................................H02k 7/04
[58] Field of Search..........310/80, 67, 266, 162, 163, 310/164, 171, 66, 64, 49, 172; 340/196, 198; 73/71.1, 517.3

[56] References Cited

UNITED STATES PATENTS

| 2,985,021 | 5/1961 | Lewis | 73/517 B |
| 3,549,923 | 12/1970 | Kurakin | 310/266 |
| 2,873,103 | 2/1959 | Hautly | 73/71.1 |
| 3,217,308 | 11/1965 | Maxwell | 340/196 |
| 2,766,392 | 10/1956 | Wagner | 310/172 |

Primary Examiner—J. D. Miller
Assistant Examiner—R. Skudy

[57] ABSTRACT

A low inertia synchro having a central magnetic core, a magnetic stator encircling the core, and a skewed conductive rotor cup in the air gap between the core and the stator. When a polyphase stator winding is energized, magnetic flux extends transversely through the air gap inducing current in the electrically conductive rotor dependent upon the angular position of the rotor. The resulting flux produced by the rotor current in turn induces a current in a single phase winding encircling the core to indicate the position of the rotor cup. The voltage null across the single phase winding may be adjusted through the cocking of the core with respect of the stator axis by tightening or loosening screws which extend through a flange on the core and abut or engage the synchro housing so as to alter the air gap between the core and the stator. The synchro may then be adjusted for angular accuracy by angularly adjusting an eccentric sleeve of the core to further alter the air gap between the core and the stator.

11 Claims, 3 Drawing Figures

ROTARY ELECTRICAL DEVICE

BACKGROUND OF THE INVENTION

1. Field of the Invention

This invention relates to rotary electrical devices of a class including synchros and resolvers. More particularly, this invention relates to a device having a single phase or polyphase stator input and having an output depending in phase and/or amplitude on the relative position of a rotor element.

Devices of this class include a central magnetic core, a magnetic stator encircling the core, and an electrically conductive rotor element disposed in the air gap between the core and the stator. When the stator winding is energized with single phase or polyphase current, flux extending transversely through the core produces a current in the rotor dependent upon rotor position. The flux resulting from the rotor current is then linked to another winding encircling the core to induce a current therein representing rotor position.

Rotary devices of this type can provide an erroneous indication of rotor position due to mechanical irregularities in the device. For example, eccentricity in the stator core or its windings will affect the flux paths in the device so as to produce an erroneous signal at the output winding and thus an erroneous indication of rotor position. In a device having an angular error resulting from such irregularities, the output winding will provide a signal which is not indicative of the angular position of the rotor. In those instances where the error is always of the same sign, the output is sufficiently erroneous to render the device unusable in many critical applications. Another error resulting from such irregularities which is also encountered in devices of this type is an error in null voltage across the output winding.

2. The Prior Art the

The existence and causes of these errors have been recognized in the prior art and efforts have been made to adjust or compensate for these errors. In U.S. Pat. No. 2,571,810 — Andresen, Jr. a rotary electrical device is disclosed having an adjustable disc attached to the end of the core with screws. When the screws are loosened, The disc may be moved transversely with respect to the axis of the core to slightly alter the air gap between the stator and the core. Thus, adjustment may be made for those irregularities in the device which result in erroneous indications of the rotor position.

However, the disc of the Andresen device which is located on the fringe of the flux path between the stator and the core is primarily concerned with a null adjustment. Although some increase in angular accuracy of the device might be achieved along with the minimizing of the null voltage, a single adjustment of the disc will not necessarily provide minimization of the null voltage and a simultaneous increase in angular accuracy. In fact, an adjustment providing a minimum or zero null voltage may actually decrease the angular accuracy of the device. Furthermore, it is believed that the location of the disc in the fringe of the flux path limits the effectiveness of the disc in adjusting for angular accuracy. Where sufficient irregularities are present, it is quite possible that the disc may be unable to suitably compensate for these irregularities to achieve a plus and a minus error in angular accuracy rather than an angular error of the same sign.

The Andresen disc is also ill suited for adjustments for angular accuracy for another reason. In order to move the disc, it is necessary to disassemble the device to permit access to the screws holding the disc in place. Once disassembled, it is impossible to check the angular accuracy of the device. Thus the device must be reassembled to check the angular accuracy after the adjustment has been made. If the adjustment is improper, the device must then be again disassembled, readjusted and reassembled to again check for angular accuracy.

SUMMARY OF THE INVENTION

In accordance with one aspect of the invention, an improved rotary electrical device is provided including a core comprising at least two members where one of the core members lying in the primary flux path between the stator and the core is angularly adjustable about the axis of the device. The adjustable core member may comprise a sleeve which is eccentric in cross section and substantially axially co-extensive with a rotor cup. The sleeve is provided with a substantially cylindrical bore which receives another core member in a manner so as to provide substantial overlap between the two core members in the primary flux path.

In accordance with another aspect of the invention, a separate null adjustment is provided to permit optimizing the angular accuracy for the device after the null adjustment has been made. The null adjustment may be made by varying the angle between the stator and core axes with a cocking action achieved by screws extending through a flange of the core into engagement with the device housing. Thus, by tightening or loosening the screws, the core is variably cocked with respect to the stator to alter the air gap therebetween.

In accordance with still another aspect of the invention, the angularly adjustable core member may be adjusted with the device assembled without the rotor assembly. As a result, the trial and error positioning of the angularly adjustable core member is facilitated since the testing of the angular accuracy for the device can be made without disassembling and assembling the device for each adjustment. In this connection, the adjustable core member in the form of a sleeve may be provided with means to be engaged by an adjusting tool. When the device without the rotor assembly is placed on a test stand which includes a rotor and a tool engages the sleeve, the sleeve may be angularly adjusted while the device remains on the test stand. Angular accuracy may then be tested and the sleeve further angularly adjusted if necessary. The steps may be repeated without removing the device from the test stand until the optimum in angular accuracy is achieved. The device may then be removed from the test stand and the sleeve may be secured in place by cement or other suitable means.

DETAILED DESCRIPTION OF A PREFERRED EMBODIMENT

Figure 1:
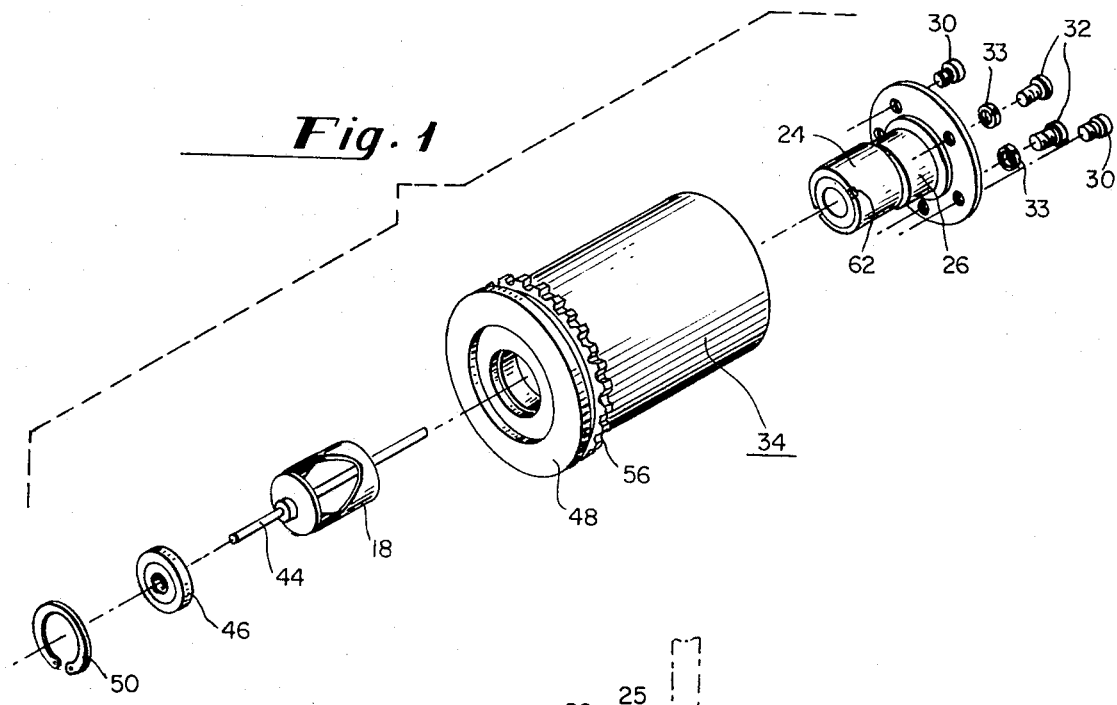
FIG. 1 is an exploded perspective view of a synchro embodying the invention.
Figure 2:
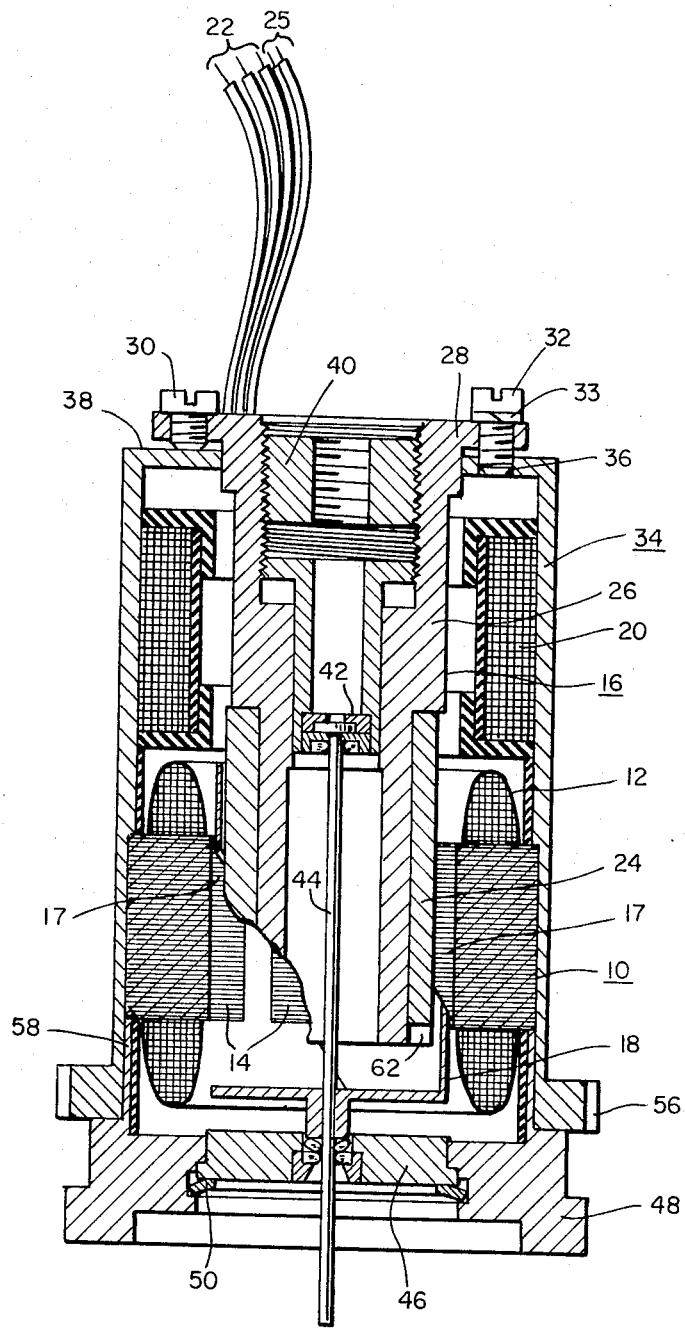
FIG. 2 is a sectional view of the synchro shown in FIG. 1.

A rotary electrical device will now be described with reference to both FIGS. 1 and 2. As best shown in FIG. 2, the rotary electrical device, in form of a synchro, comprises a stator 10 including a polyphase stator winding 12 wound on laminated stator pole pieces 14 and a multi-member core 16. A skewed conductive rotor cup 18 best shown in FIG. 1 is located in a cylindrical air gap 17 between the core 16 and the stator 10. A stationary single phase rotor winding 20 is axially displaced from the stator winding 12 and encircles the core 16.

When a polyphase input is applied to input leads 22 to energize the stator winding 12, transverse lines of flux are generated between pole pieces 14 through the core 16. The transverse flux crosses the air gap 17 thereby inducing a current in the rotor cup 18 which varies as a function of the rotor cup position. The flux generated by the rotor cup current will extend longitudinally through the core 16 to induce a current in the rotor winding 20. Since the current and the voltage of the winding 20 vary with the position of the rotor cup 18, the signal detected at leads 25 of the rotor winding 20 is indicative of the position assumed by the rotor cup 18.

However, the signal detected at the leads 25 may be erroneous due to irregularities in the synchro. In accordance with one aspect of this invention, certain of these irregularities are corrected by providing a core 16 including an eccentric sleeve 24 which may be angularly adjusted to alter the air gap and thereby achieve a high degree of angular accuracy from the synchro. As shown in FIG. 2, the thickness of the sleeve 24 varies around the circumference thereof and is therefore asymmetrical about the axis. With the sleeve 24 in the position shown in FIG. 2, the air gap 17 between the core 16 and the pole faces 14 is reduced at the left and increased at the right. By rotating the sleeve 24 about the axis of the synchro, the air gap will be varied. Note that the sleeve 24 and the rotor cup 18 are substantially coextensive along the axis, and the sleeve 24 lies in the primary flux path between the pole faces 14. Thus any slight angular adjustment of the sleeve 24 has a very substantial effect upon the flux path between pole faces.

The core 16 also comprises an angularly fixed core member 26 having substantial overlap with sleeve 24 at one end and having a flange 28 at the other end. In accordance with another important aspect of the invention, the core member 16 may be cocked by adjusting screws 30 and screws 32 extending through a lock washer 33 and into holes in the flange 28. This cocking of the core 16 permits the null to be adjusted to a minimum independently of the angular accuracy adjustment achieved by rotating the sleeve 24.

As can be seen by reference to FIG. 2, a tightening of the screw 32 which threadedly engages the housing 34 at a hole 36 will move the core 16 to the left thereby further altering the air gap. Of course, when the screw 32 is backed off, the cocking action is in the opposite direction. The amount and direction of this cocking is also adjusted with screws 30 which are located between screws 32 and space the flange 28 from the end 38 of the housing 34.

In order to properly support the rotor cup 18 within the air gap 17, the core 16 includes a central core member 40 which threadedly engages the opening in the core member 26. A jeweled bearing assembly 42 is then provided at the inside end of the central core member 40 to support one end of the rotor shaft 44. The other end of the rotor shaft 44 is supported by a jeweled bearing assembly 46 which is held within a mounting diameter 48 by a retainer ring 50.

It will of course be appreciated that the rotor assembly may be removed by removal of the retainer ring 50 and pulling the rotor cup 18 and the rotor shaft 44 out through an opening in the mounting diameter 48. It will also be appreciated that the central core member 40 which carries the bearing assembly 42 may also be removed by simply unscrewing the core member 40 from its position within the core member 26.

Figure 3:
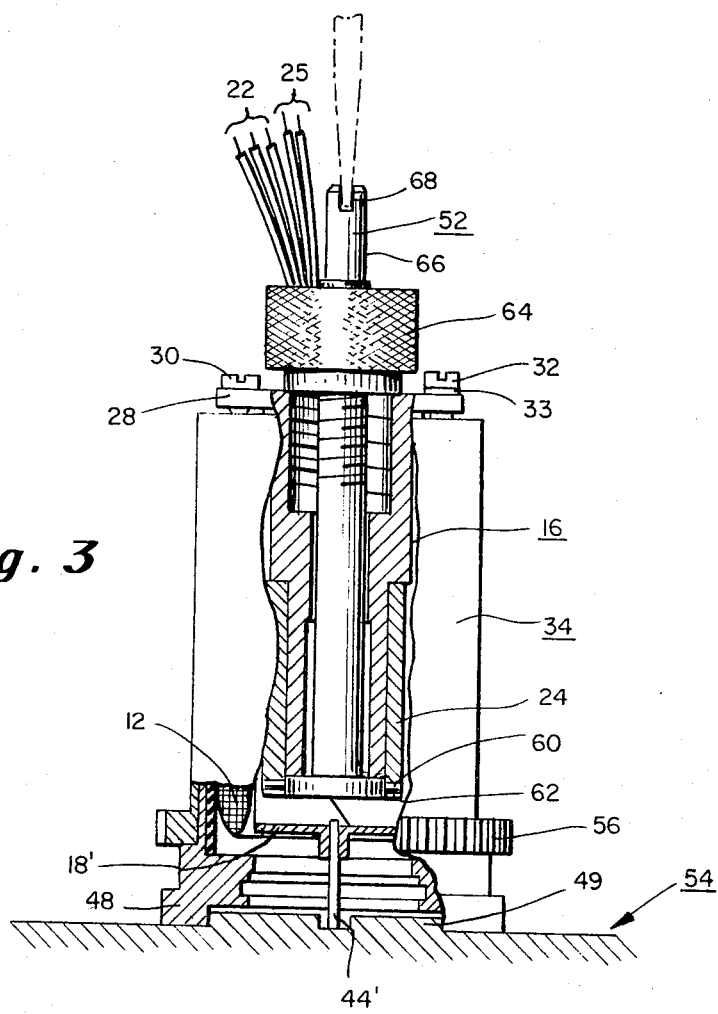
FIG. 3 is a sectional view of the device shown in FIGS. 1 and 2 on a test stand.

Having once removed the rotor assembly and the central core member 40, an adjusting tool 52 may be inserted into the central opening through the core 16 and the synchro and the tool may be placed on a test stand 54 as shown in FIG. 3. The test stand 54 includes a locating diameter 49 having a rotor cup 18' providing a close fit with the mounting diameter 48 and permanently mounted on a shortened rotor shaft 44'. By making the rotor cup 18' substantially identical to the rotor of the synchro, a complete synchro capable of being tested is provided.

The null adjustment described previously may be made by cocking the core 16 with respect to the axis of the device by tightening or loosening screws 30 and 32 when the rotor cup 18' is in the null position. By connecting the output leads 25 to a suitable voltage detector, the screws 30 and 32 may be loosened or tightened until a minimum null is observed. The angular position of the sleeve 24 may be adjusted while the synchro is on the test stand 54 by providing radially extending lugs 60 on the tool 52 which are adapted to be received by slots 62 at the end of the sleeve 24. Other means of engagement between the sleeve 24 and the tool 52 may be provided, e.g., axially extending holes in the end of the sleeve 24 with axially extending lugs inserted therein. The lugs 60 are held in place within the slots by tightening a nut 64 threadedly engaging a central shaft 66 down on to the flange 28 as shown in FIG. 3. Then, by rotating the central shaft 66 with a screw driver or other appropriate tool which is inserted in a slot 68, the central shaft 66 of the tool 52 may be rotated thereby rotating the sleeve 24. Note that the sleeve 24 may be adjusted and an angular accuracy check run by utilizing the output from leads 25 while the synchro remains on the test stand 54. In other words, for any adjusted position of the sleeve 24, the rotor cup 18' may be rotated to the various angular positions to check the angular accuracy of the synchro for that sleeve position. The sleeve 24 may be further adjusted and the angular accuracy check repeated until the proper degree of angular accuracy is obtained. In many instances, it will be desirable to achieve a plus and minus error in angular accuracy rather than an error of a single sign.

Various steps in the adjustments fro synchro irregularities will now be described with reference to FIG. 3. The lugs 60 are inserted into the slots 62 and the nut 64 is tightened down on the flange 28 before the synchro absent the rotor 18 and the central core member 40 is lowered down into the test stand 54. After the synchro is in place on the test stand, a suitable polyphase power source is connected to the stator leads 22 while a suitable detector or meter is connected to the rotor leads 25. With the source and the meter properly connected, a screw driver is inserted into the head of the screws 32 and the core 16 is appropriately cocked until the minimum null is achieved. Of course, by tightening different screws 32, the core 16 may be cocked in different directions.

After the null adjustment has been completed, the angular accuracy adjustment may be performed by inserting a screw driver or other tool in the slot 68 of the tool 52. By rotating the screw driver and running the angular accuracy checks for various angular positions of the rotor 18 and doing the same for other adjusted positions of the sleeve 24, the optimum position for the sleeve 24 may be determined. Having determined the optimum position for the sleeve 24, the synchro may be removed from the test stand 54 and the tool 52 removed from the synchro by unscrewing the nut 64 and passing the tool 52 down through the housing 34 past the stator 10. With the end of the sleeve now exposed, cement may now be applied to the end of the core to fix the sleeve 24 in the optimum adjusted position with respect to the core member 28. The central core member 40 is then inserted in one end of the synchro while the rotor assembly, the jeweled bearing assembly 46, and the retainer ring 50 are inserted into the other end.

Although the invention has been illustrated in a synchro, it will be appreciated that the invention may be embodied in other rotary electrical devices. It will also be understood that various modifications may be made in the particular embodiment shown without departing from the spirit and scope of the invention as set forth in the appended claims.

What is claimed is:

1. An improved rotary electrical device comprising a central magnetic core, a magnetic stator surrounding said core and having pole faces adjacent thereto, a stator winding for energizing said stator to produce magnetic flux extending between said pole faces and transversely of said core, a skewed conductive rotor disposed in the air gap between said pole faces and said core so as to have a rotor current generated therein, and a rotor winding surrounding said core and longitudinally displaced from said stator, said rotor winding being energized by the flux generated by said rotor current so as to produce an output signal indicative of relative rotor position, the improvement residing in said core comprising:

a core member lying in the primary flux path between said pole faces and said core, said core member being unsymmetrical with respect to the longitudinal axis of said device and angularly movable about said axis so as to permit adjustment of said one core member to maximize the angular accuracy of said device.

2. The improved rotary electrical device of claim 1 wherein said one core member is substantially coextensive with said rotor along the longitudinal axis of said transmitter.

3. The improved rotary electrical device of claim 2 wherein said core comprises another core member, said one core member comprising a sleeve having a bore mating with said other core member and having substantial axial overlap therewith.

4. The improved rotary electrical device of claim 3 wherein said sleeve is eccentric in cross-section.

5. The improved rotary electrical device of claim 4 wherein said sleeve has a means to be engaged by a member inserted into said device for permitting angular adjustment of said sleeve.

6. The improved rotary electrical device of claim 5 wherein said means to be engaged by said member comprises a slot at one end of said sleeve.

7. The improved rotary electrical device of claim 6 further comprising means for minimizing the null voltage by adjusting the angle between the axis of said core and the axis of said stator.

8. The improved rotary electrical device of claim 6 further comprising a housing, said other core member including a flange having at least one screw extending through an opening in said flange and engaging said housing, said core being cocked at various angles with respect to the longitudinal axis of said device as said screw is moved through said flange so as to minimize the null voltage of said device.

9. The improved rotary electrical device of claim 8 wherein said housing has an opening receiving said screw.

10. An improved rotary electrical device comprising a central magnetic core, a magnetic stator surrounding said core and having pole faces adjacent thereto, an input winding for energizing said stator to produce magnetic flux extending between said pole faces and transversely of said core, a skewed conductive rotor disposed between said pole faces and said core so as to have a rotor current generated therein, and an output winding encircling said core and longitudinally displaced from said stator, said output winding being energized by the flux generated by said rotor current so as to produce an output signal indicative of relative rotor position, the improvement residing in said core comprising:

as at two core members with one of said core members being eccentric in cross-section, said one core member being substantially coextensive with said rotor along the longitudinal axis thereof and angularly adjustable with respect to the other of said core members so as to maximize the angular accuracy of said device.

11. An improved rotary electrical device comprising a central magnetic core, a polyphase magnetic stator surrounding said core and having pole faces adjacent thereto, an input winding for energizing said stator to produce magnetic flux extending from a path between said pole faces and transversely of said core, a skewed conductive rotor disposed in the flux path between said pole faces and said core and having a rotor current induced therein by said flux, and an output winding surrounding said core and energized by the flux generated by said rotor current so as to provide an output indicative of relative rotor position the improvement comprising:

a means for minimizing the null voltage of the device by adjusting the angle between the axis of said core and the axis of said stator altering the air gap between said core and said rotor; and a means for maximizing the angular accuracy of said device without substantially affecting the null by further altering the air gap between said core and said rotor.

* * * * *